United States Patent
Lee

(10) Patent No.: US 7,135,982 B2
(45) Date of Patent: Nov. 14, 2006

(54) HOME NETWORK SYSTEM AND CONTROL METHOD FOR THE SAME

(75) Inventor: Yeon Kyoung Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 10/917,313

(22) Filed: Aug. 13, 2004

(65) Prior Publication Data

US 2005/0184852 A1  Aug. 25, 2005

(30) Foreign Application Priority Data

Feb. 25, 2004 (KR) ............... 10-2004-0012578

(51) Int. Cl.
    *G08B 21/00* (2006.01)
(52) U.S. Cl. ............... 340/635; 340/10.1; 340/310.06
(58) Field of Classification Search ............... 340/635, 340/310.16, 3.1, 10.1, 825.52, 505
    See application file for complete search history.

(56) References Cited

U.S. PATENT DOCUMENTS

| | | | |
|---|---|---|---|
| 4,703,306 A * | 10/1987 | Barritt | 340/310.18 |
| 4,808,841 A * | 2/1989 | Ito et al. | 307/11 |
| 6,275,922 B1 * | 8/2001 | Bertsch | 712/36 |
| 6,535,110 B1 * | 3/2003 | Arora et al. | 340/310.11 |
| 6,686,838 B1 * | 2/2004 | Rezvani et al. | 340/506 |
| 6,750,781 B1 * | 6/2004 | Kim | 340/825.69 |
| 6,947,156 B1 * | 9/2005 | Jeyachandran et al. | 358/1.15 |
| 6,975,211 B1 * | 12/2005 | Atsuta et al. | 340/310.16 |
| 6,987,462 B1 * | 1/2006 | Bae et al. | 340/825.72 |
| 6,990,379 B1 * | 1/2006 | Gonzales et al. | 700/19 |

FOREIGN PATENT DOCUMENTS

| | | |
|---|---|---|
| KR | 1999-50398 | 7/1999 |
| KR | 2001-106970 | 12/1999 |

OTHER PUBLICATIONS

English language abstract of Korean 2001-106970.
English language abstract of Korean 1999-50398.

* cited by examiner

*Primary Examiner*—John Tweel, Jr.
(74) *Attorney, Agent, or Firm*—Greenblum & Bernstein, P.L.C.

(57) ABSTRACT

A home network system and a control method thereof in which an electric home appliance periodically transmits an alive message through a network to inform that it is in operation, and a home server transmits/receives messages to/from the electric home appliance via the network to control the electric home appliance. The home server transmits an operation identification request message to the electric home appliance when no alive message from the electric home appliance is received by the home server.

15 Claims, 6 Drawing Sheets

HOME NETWORK SYSTEM AND CONTROL METHOD FOR THE SAME

BACKGROUND OF THE INVENTION

1. Field of the Invention

The present invention relates to a home network system and a control method for the same, and more particularly to a home network system capable of identifying operation statuses of electric home appliances connected to the home network system via a network, and receiving operation control commands, thereby controlling operations of the associated electric home appliances, while periodically receiving alive messages from the electric home appliances, each of which is maintained in a standby state because there is no associated operation control command received by the home network system, thereby displaying connected statuses of the standby electric home appliances, and a control method for this home network system.

2. Description of the Related Art

FIG. 1 is a schematic view illustrating a conventional home network system.

Recently, distribution of home network systems has been increased. Such a home network system is implemented by connecting a plurality of electric home appliances installed in a home through a single network, and connecting the network to an external network, for example, the Internet, so as to remotely control the electric home appliances in the home or at an outdoor place.

In order to allow the manager of the home network system to control the electric home appliances connected through the network in a central control manner, one of the electric home appliances must have an input unit adapted to allow the manager of the home network system to input control commands to respective electric home appliances, and an output unit adapted to output information about respective statuses of operations carried out in accordance with the input control commands. This electric home appliance is called a "home server". In FIG. 1, this home server is designated by reference character "HS".

The home server HS includes an Internet module adapted to process control signals transmitted to or received from the electric home appliances connected to the home network, and to connect the home network to an external network, that is, the Internet. In FIG. 1, the home network is designated by reference character "N". The electric home appliances including the home server HS may be refrigerators, air conditioners, washing machines, TVs, etc.

The electric home appliances other than the home server HS perform control commands received thereto through the home server HS, and transmit data indicative of the results of operations carried out in response to respective control commands. These electric home appliances are called "client electric home appliances". In FIG. 1, the client electric home appliances are designated by reference characters "C1" to "C4". Although the home network system includes four client electric home appliances C1 to C4 in the case of FIG. 1, it may include only one client electric home appliance. Each of the client electric home appliances C1 to C4 is internally provided with a microcomputer to process data received thereto through the home network N and data to be transmitted through the home network N.

Thus, the home server, which is a refrigerator in the case of FIG. 1, is connected through the home network N with the client electric home appliances C1 to C4, which are a telephone, a lamp, a microwave oven, and a washing machine, respectively, in the case of FIG. 1, so as to perform transmission and reception of control signals, thereby controlling operations of the client electric home appliances C1 to C4.

In the conventional home network system having the above-mentioned configuration, there may be a problem in that, when the network N is instable, a control signal from the home server HS may not be transmitted to an associated one of the client electric home appliances C1 to C4.

In this case, the home server HS determines that the connection between the home server HS and the associated client electric home appliance has failed. Based on this determination, the home server HS excludes this client electric home appliance from the targets to be controlled.

In order to again perform the control for the client electric home appliance, which has been determined as failing the connection to the home server, it is necessary to release the connection of the failed client electric home appliance and the network, and then to again connect the failed client electric home appliance to the network, so as to again try transmission of a control signal to the client electric home appliance.

Meanwhile, when a new client electric home appliance is connected to the network, an operation initiation message is transmitted to the home server. Where the network is instable, however, the operation initiation message may not reach the home server. In this case, the home server cannot recognize the connection of the client electric home appliance.

In order to enable the home server to normally recognize the newly connected client electric home appliance, it is necessary to release the connection of the client electric home appliance, and then to again connect the client electric home appliance to the network. Alternatively, it is necessary to reset the system of the home server.

SUMMARY OF THE INVENTION

The present invention has been made in view of the above-mentioned problems incurred in the related art, and an object of the invention is to provide a home network system capable of identifying operation statuses of electric home appliances connected to the home network system via a network, and receiving operation control commands, thereby controlling operations of associated electric home appliances, while periodically receiving alive messages from electric home appliances, each of which is maintained in a standby state because there is no associated operation control command received by the home network system, thereby displaying connected statuses of the standby electric home appliances.

In accordance with one aspect, the present invention provides a home network system comprising: one or more electric home appliances connected to a network, each of the electric home appliances periodically transmitting an alive message through the network to inform of the fact that the electric home appliance is in operation; and a home server connected to the network such that the home server transmits/receives messages to/from each electric home appliance via the network to control the electric home appliance while monitoring a status of the electric home appliance, the home server transmitting an operation identification request message to the electric home appliance when no alive message from the electric home appliance is received by the home server for a predetermined time.

The home server may comprise a communication module connected to the network, and adapted to transmit/receive messages to/from each electric home appliance, and a server controller for monitoring the status of each electric home appliance, based on a message received from the electric home appliance via the communication module, and generating a control signal for the electric home appliance. The home server may further comprise a display unit for displaying information about the status of each electric home appliance or a connection status of the electric home appliance under control of the server controller.

The server controller may comprise a control module for controlling each electric home appliance, and a status sensing unit for monitoring the status of each electric home appliance, based on the alive message from the electric home appliance received via the communication module, and transmitting, to the electric home appliance, a status identification request message when no alive message from the electric home appliance is received by the status sensing unit for a predetermined time, so as to identify the status of the electric home appliance.

Each electric home appliance may comprise a microcomputer for generating an alive message to inform the home server of the fact that the electric home appliance is in operation, and a communication module connected to the network, and adapted to transmit/receive messages to/from the home server via the network. The microcomputer may comprise a control module for controlling the electric home appliance, based on data received by the control module through the communication module, and a status transmission module for periodically generating an alive message informing of the fact that the electric home appliance is in operation, and transmitting the alive message to the home server via the communication module.

In accordance with another aspect, the present invention provides a method for controlling a home network system including electric home appliances connected to a network, comprising the steps of: (A) controlling each of the electric home appliances to transmit an alive message informing of the fact that the electric home appliance is in operation; (B) receiving the alive message, and identifying an operation status of the electric home appliance, based on the received alive message; and (C) displaying the identified operation status of the electric home appliance.

The method may further comprise the step of (D) transmitting a status identification request message to the electric home appliance to identify whether the electric home appliance is operating normally, when no alive message from the electric home appliance is received for a predetermined time at the step (B). The method may further comprise the steps of (E) maintaining the electric home appliance in the connected state thereof when the identified operation status of the electric home appliance is displayed at the step (C), and returning to the step (B), and (F) temporarily releasing the connected state of the electric home appliance when no status identification message from the electric home appliance is received for a predetermined time in response to the status identification request message at the step (D). The method may further comprise the step of (G) removing an icon representing the displayed identified operation status of the electric home appliance when the connected state of the electric home appliance is temporarily released at the step (F).

Accordingly, the home network system can control respective operations of the associated electric home appliances by monitoring respective operation statuses of the electric home appliances connected to the home network system via a network, and receiving operation control commands for the electric home appliances. The home network system also periodically identifies the connection status of the electric home appliances, each of which is maintained in a standby state because there is no associated operation control command received by the home network system, thereby updating operation statuses and connection statuses of the electric home appliances. Thus, it is possible to achieve an enhancement in convenience in using the home network system.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, embodiments of a home network system according to the present invention will be described in detail with reference to the annexed drawings. Of course, the present invention is not limited to the illustrated embodiments and drawings.

Figure 1:
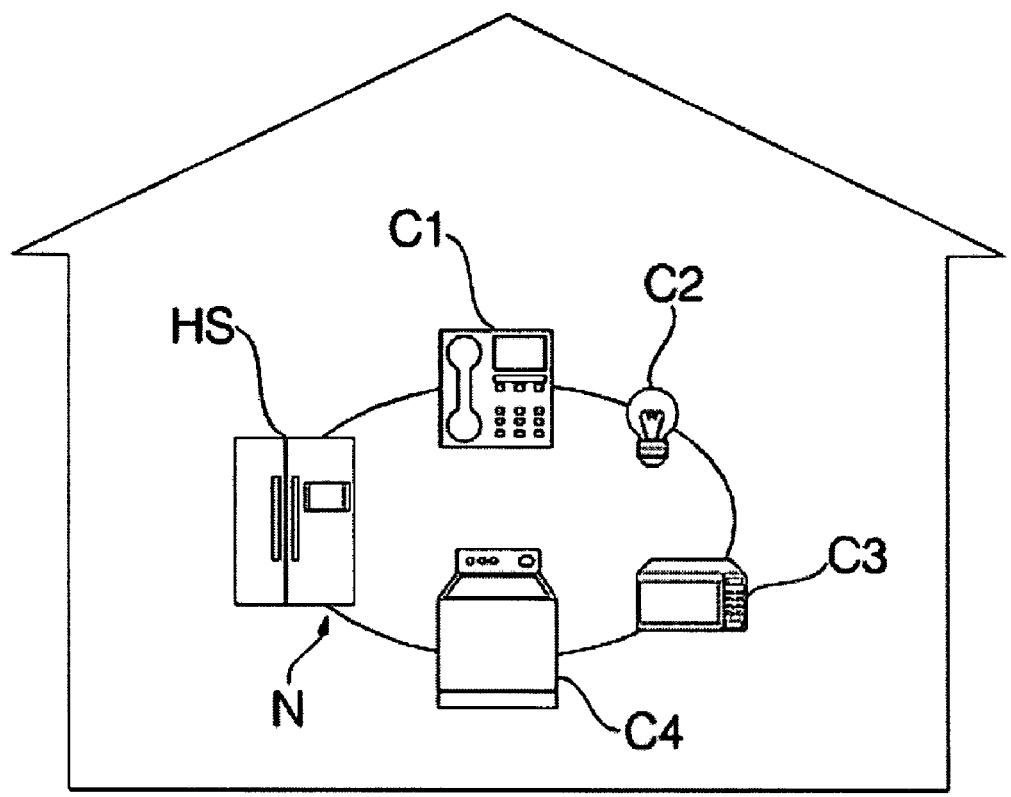
FIG. 1 is a schematic view illustrating a conventional home network system.
Figure 2:
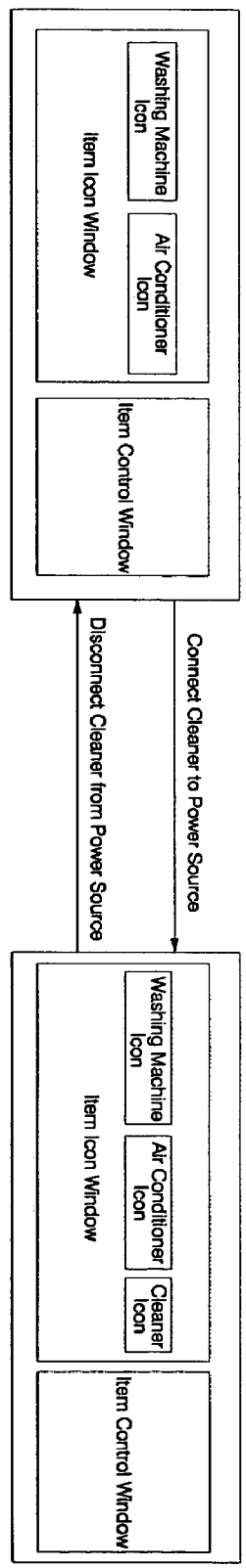
FIG. 2 is a schematic view illustrating a home network system according to a first embodiment of the present invention.
Figure 3:
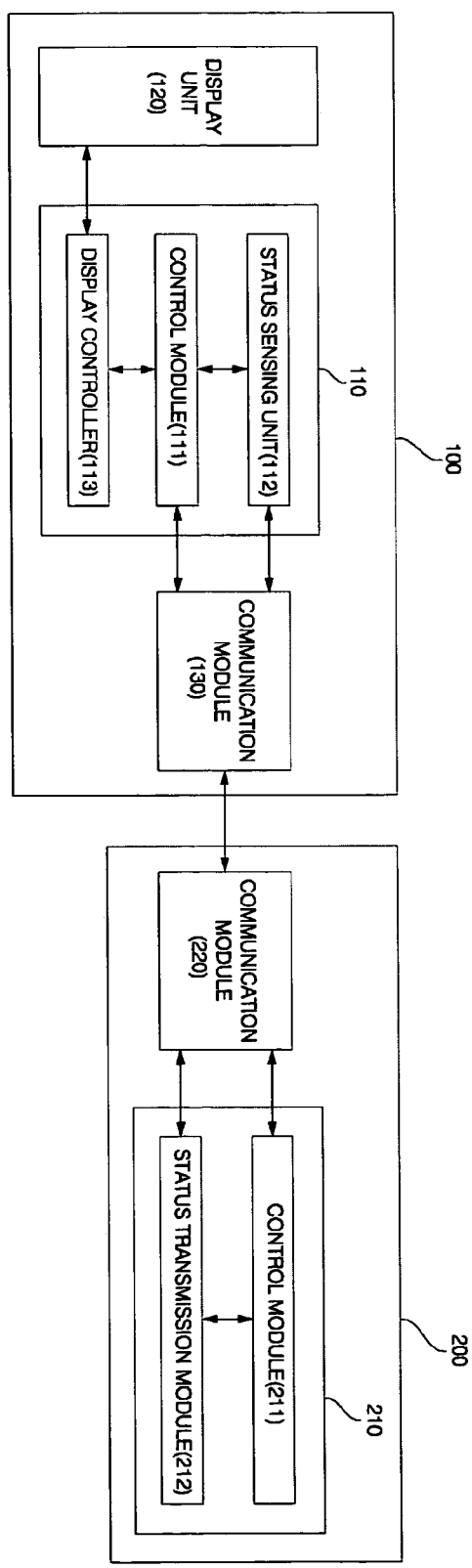
FIG. 3 is a block diagram illustrating a home server and an electric home appliance, which are included in the home network system according to the first embodiment of the present invention.

FIG. 2 is a schematic view illustrating a home network system according to a first embodiment of the present invention. FIG. 3 is a block diagram illustrating a home server and an electric home appliance, which are included in the home network system according to the first embodiment of the present invention.

As shown in FIG. 3, the home network system according to the first embodiment of the present invention includes one or more electric home appliances 200 connected to a network. Each electric home appliance 200 periodically transmits an alive message through the network in order to inform of the fact that the electric home appliance 200 is in operation. The home network system also includes a home server 100 connected to the network such that the home server 100 transmits/receives messages to/from each electric home appliance 200 via the network. Where there is no alive message from one of the electric home appliances 200 received by the home server 100 for a predetermined time, the home server 100 also transmits an operation identification request message to the electric home appliance 200 transmitting no alive message.

The network, to which the home server 100 and electric home appliances 200 are connected, may be a local area network (LAN), a typical one of which is an Ethernet, a wireless communication network using a radio frequency of 2.4 GHz (wireless LAN), or an electric power line communication network, in which data is transmitted through a low-voltage electric power line of, for example, a voltage range from 100 V to 220 V, in a state of being carried by a high-frequency signal having a frequency ranging from several hundred kHz to several tens of MHz.

Each electric home appliance 200 includes a microcomputer 210 for generating an alive message to inform the home server 100 of the fact that the electric home appliance 200 is in operation, and a communication module 220 for performing conversion of data such that the communication module 220 can transmit/receive messages to/from the home server 100 via the network.

The microcomputer 210 of each electric home appliance 200 includes a control module 211 for controlling operation of the electric home appliance 200, based on data received by the control module 211 through the communication module 220 or an input unit included in the control module 211, and a status transmission module 212 for periodically generating an alive message informing of the fact that the electric home appliance 200 is in operation, at intervals of a predetermined time, and transmitting the alive message to the home server 100 via the communication module 220.

When one electric home appliance 200 is switched from a status, in which the connection of the electric home appliance 200 to the network is released (hereinafter, referred to as a disconnected status), to a status, in which the electric home appliance 200 is re-connected to the network (hereinafter, referred to as a re-connected status), the status transmission module 212 of the electric home appliance 200 transmits, to the home server 100, a connection identification message informing of the fact that the electric home appliance 200 is in a state of being connected to the network.

The home server 100 includes a communication module 130 connected to the network, and adapted to transmit/receive messages to/from each electric home appliance 200, and a server controller 110 for transmitting control signals adapted to monitor the status of each electric home appliance 200 and to control operation of each electric home appliance 200, based on a message received from the communication module 130.

The home server 100 also includes a display unit 120 for displaying the connection status of each electric home appliance 200 connected to the network, or information about the status of each electric home appliance 200.

The server controller 110 includes a control module 111 for controlling the operation of each electric home appliance 200 connected to the network, and a status sensing unit 112 for monitoring the status of each electric home appliance, based on an alive message received from the electric home appliance via the communication module 130, and transmitting, to the electric home appliance 200, a status identification request message when no alive message is received from the electric home appliance 20 for a predetermined time.

As shown in FIG. 2, the server controller 110 further includes a display controller for controlling the display unit 120 to display the connection status information and operation status information of each electric home appliance 200 in the form of icons on different regions of a display screen included in the display unit 120, respectively. When one electric home appliance 200 is disconnected from the network, the display unit 120 removes the icon of the electric home appliance 200 from the display screen. When the disconnected electric home appliance 200 is re-connected to the network, the display unit 120 re-displays the icon of the electric home appliance 200.

Figure 4:
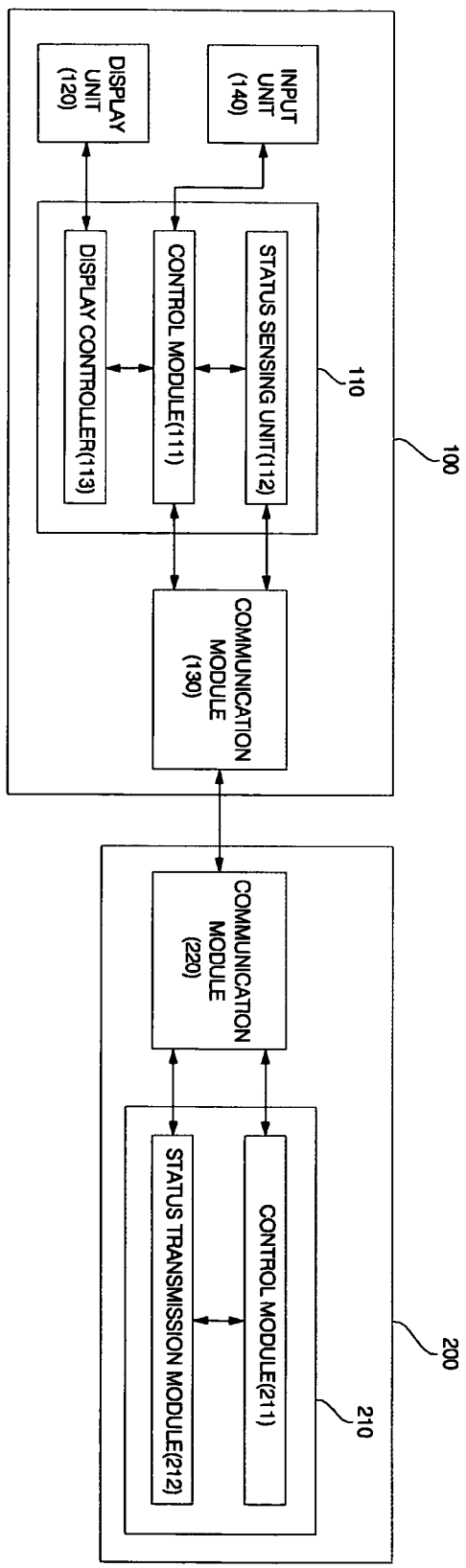
FIG. 4 is a block diagram illustrating a home network system according to a second embodiment of the present invention.

FIG. 4 is a block diagram illustrating a home network system according to a second embodiment of the present invention. Since the configuration of the home network system according to the second embodiment is similar to that of the first embodiment, similar constituent elements are designated by the same reference numeral while being named by the same name. Also, no description will be given of the similar constituent elements.

In accordance with the second embodiment of the present invention, the home server 100 includes an input unit 140, to which operation commands adapted to control operations of respective electric home appliances 200 are inputted from the outside of the home network system.

In response to an operation command inputted through the input unit 140, the server controller 110 generates a control signal for controlling an associated one of the electric home appliances 200. The input unit 140 may be implemented by an external input device such as a keyboard, a mouse, or a tablet, so as to allow inputting of an external message. Alternatively, the input unit 140 may be implemented by a touch screen internally provided in the home server 100 while being integral with an output unit included in the home server 100.

Accordingly, the user can select a desired one of the electric home appliances 200 to control the selected electric home appliance 200 by touching the icon of the selected electric home appliance 200 displayed on the display unit 120, thereby inputting an operation command for the selected electric home appliance 200. When the operation command is inputted as the corresponding icon is touched, a control window is displayed on the display unit 120 to allow the user to input control commands for the selected electric home appliance 200 through the control window. Accordingly, the user can input a control command for controlling the selected electric home appliance 200 by touching a corresponding icon displayed on the control window. In response to the inputted control command, the microcomputer 110 generates a control signal adapted to control the selected electric home appliance 200.

Figure 5:
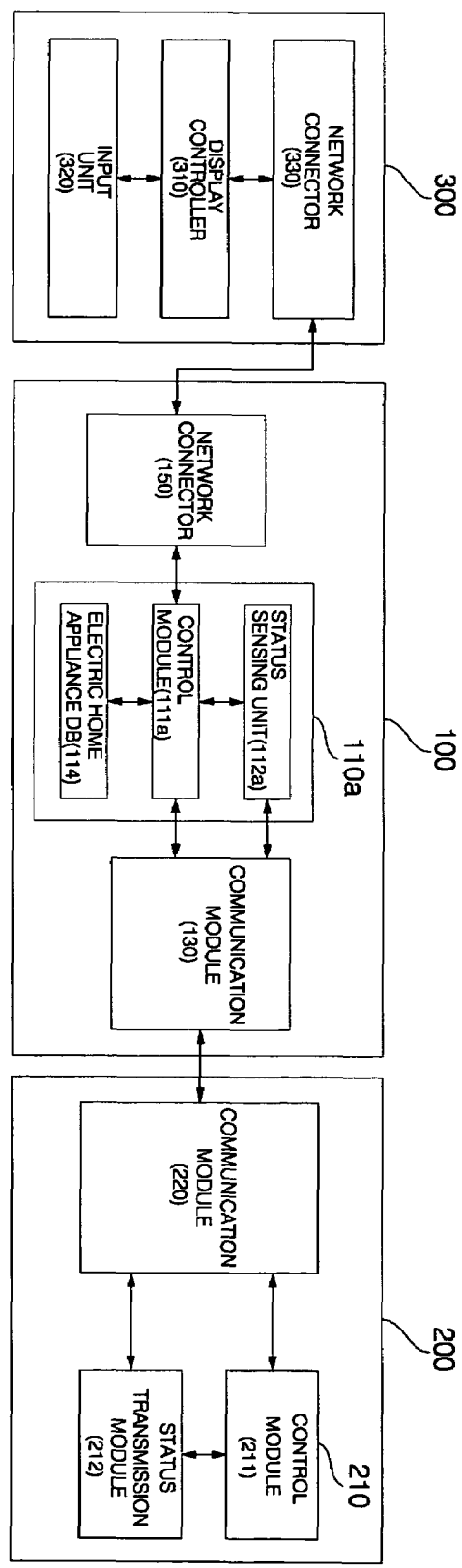
FIG. 5 is a block diagram illustrating a home network system according to a third embodiment of the present invention.

FIG. 5 is a block diagram illustrating a home network system according to a third embodiment of the present invention. Since the configuration of the home network system according to the third embodiment is similar to that of the first embodiment, except for the input unit and display unit, similar constituent elements are designated by the same reference numeral while being named by the same name. Also, no description will be given of the similar constituent elements.

In accordance with the third embodiment of the present invention, the above described input unit and display unit may be implemented by an independent input/output device 300, which may be a web pad directly connected to the home server 100 by means of a particular connector.

The input/output device 300 includes a network connector 330 connected to the home server 100, and adapted to input or output messages, a display controller 310 adapted to display a message received from the home server 100 in the form of an icon, and input unit 320 adapted to input control commands for controlling operations of respective electric home appliances 200 connected to the home server 100 and the network.

The network connector 330 may be included in the home server 100. The network connector 330 may perform transmission and reception of data through a universal serial bus (USB) port. Also, the network connector 330 may perform the data transmission and reception through the above-described network or a separate network.

In accordance with the second embodiment of the present invention, the home server 100 includes a server controller 110a, which has a configuration different from that of the first embodiment. That is, the server controller 110a includes an electronic home appliance database (DB) 114 for storing connection status information or operation status information of each electronic home appliance 200 connected to the home server 100 via the network, in addition to a control module 111a and a status sensing unit 112a, which are similar to those of the first embodiment.

Hereinafter, a method for controlling the home network system having the above-described configuration according to the present invention will be described with reference to FIG. 6.

Figure 6:
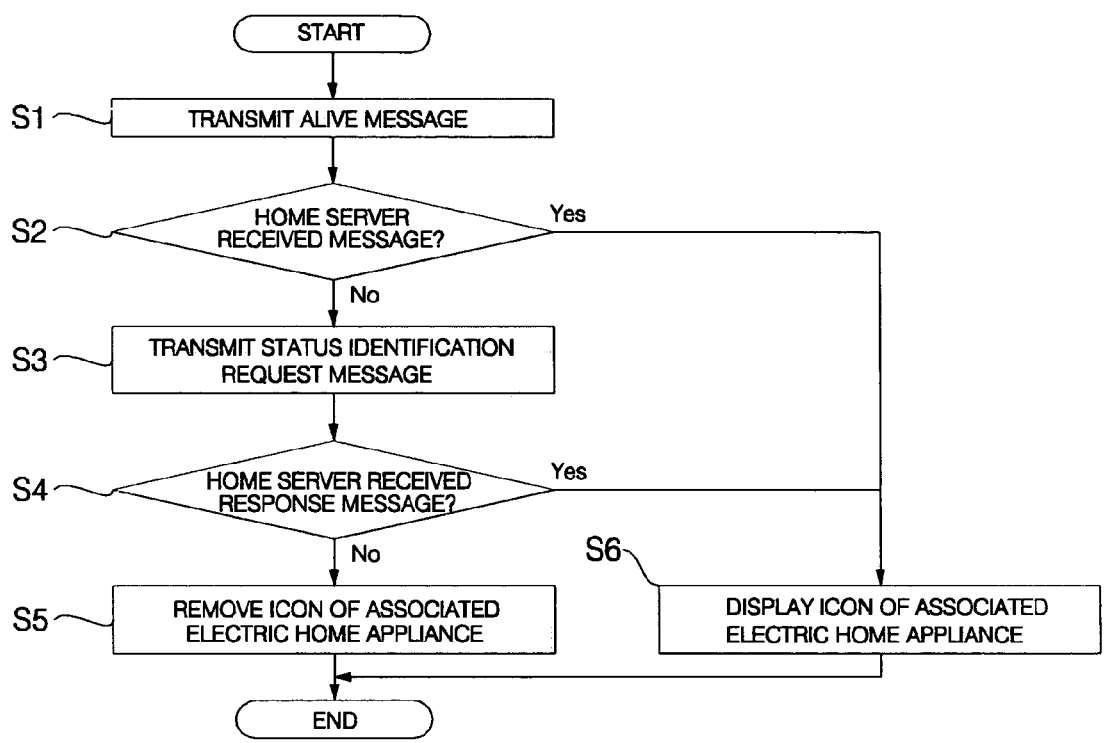
FIG. 6 is a flow chart illustrating the control method for the home network system according to the present invention.

FIG. 6 is a flow chart illustrating the control method for the home network system according to the present invention.

When electric power is supplied to the electric home appliances 200 connected to the home network, each of the electric home appliance 200 transmits, to the home server 100, an alive message informing of the fact that the electric home appliance 200 is in operation, in accordance with this control method. Each electric home appliance 200 periodically performs the alive message transmission, so as to inform the home server 100 of the fact that the electric home appliance 200 is normally in operation in a state of being connected to the network (S1).

Based on the alive message received from each electric home appliance 200, the home server 100 identifies the operation status of the electric home appliance 200 (S2). As the result of the identification, the home server 100 determines that the electric home appliance 200 transmitting the alive message is normally in operation, and displays an icon corresponding to the electric home appliance 200.

Where the home server 100 cannot receive, for a predetermined time, the alive message transmitted from one of the electric home appliances 200 due to delay of message transmission speed or message transmission/reception errors caused by instability of the network, the home server 100 transmits a status identification request message to the problematic electric home appliance 200, in order to identify whether the electric home appliance 200 is operating normally.

Upon receiving the status identification request message, the electric home appliance 200 re-transmits the alive message as a status identification message. When the home server 100 receives the alive message from the electric home appliance 200 (S4), it identifies that the electric home appliance 200 is operating normally. As the result of the identification, the home server 100 maintains the icon of the electric home appliance 200 in a displayed state.

On the other hand, when the home server 100 cannot receive, for a predetermined time, an alive message from the electric home appliance 200 responding to the status identification request message, the home server 100 temporarily releases the connection thereof to the electric home appliance 200, and removes the icon of the electric home appliance 200 (S5).

Thus, where the home server 100 cannot receive an alive message transmitted from one electric home appliance 200 due to message transmission/reception errors caused by instability of the connection between the electric home appliance 200 and the network, the home server 100 can monitor whether or not the electric home appliance 200 is operating normally, by transmitting a status identification request message to the electric home appliance 200, and subsequently receiving an alive message from the electric home appliance 200 responding to the status identification request message.

As apparent from the above description, the present invention provides a home network system capable of identifying operation statuses of electric home appliances connected to the home network system via a network, and receiving operation control commands, thereby controlling operations of the associated electric home appliances, while periodically receiving alive messages from the electric home appliances, each of which is maintained in a standby state because there is no associated operation control command received by the home network system, thereby updating operation statuses and connection statuses of the electric home appliances. The present invention also provides a method for controlling the home network system. Thus, it is possible to achieve an enhancement in convenience in using the home network system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0012578, filed on Feb. 25, 2004, the contents of which are herein expressly incorporated by reference in its entirety.

What is claimed is:

1. A home network system comprising:
one or more electric home appliances connected to a network, each of the electric home appliances periodically transmitting an alive message through the network to inform of the fact that the electric home appliance is in operation; and
a home server connected to the network such that the home server transmits/receives messages to/from each electric home appliance via the network to control the electric home appliance while monitoring a status of the electric home appliance, the home server transmitting an operation identification request message to the electric home appliance when no alive message from the electric home appliance is received by the home server for a predetermined time.

2. The home network system according to claim 1, wherein each electric home appliance comprises:
a microcomputer for generating an alive message to inform the home server of the fact that the electric home appliance is in operation; and
a communication module connected to the network, and adapted to transmit/receive messages to/from the home server via the network.

3. The home network system according to claim 2, wherein the microcomputer comprises:
a control module for controlling the electric home appliance, based on data received by the control module through the communication module; and
a status transmission module for periodically generating an alive message informing of the fact that the electric home appliance is in operation, and transmitting the alive message to the home server via the communication module.

4. The home network system according to claim 1, wherein the home server comprises:
a communication module connected to the network, and adapted to transmit/receive messages to/from each electric home appliance; and
a server controller for monitoring the status of each electric home appliance, based on a message received from the electric home appliance via the communication module, and generating a control signal for the electric home appliance.

5. The home network system according to claim 4, wherein the server controller comprises:
   a control module for controlling each electric home appliance; and
   a status sensing unit for monitoring the status of each electric home appliance, based on the alive message from the electric home appliance received via the communication module, and transmitting, to the electric home appliance, a status identification request message when no alive message from the electric home appliance is received by the status sensing unit for a predetermined time, so as to identify the status of the electric home appliance.

6. The home network system according to claim 5, wherein the home server further comprises:
   a display unit for displaying information about the status of each electric home appliance or a connection status of the electric home appliance under control of the server controller.

7. The home network system according to claim 6, wherein:
   the home server further comprises a display unit for displaying information about the status of each electric home appliance or a connection status of the electric home appliance under control of the server controller; and
   the server controller further comprises a display controller for controlling the display unit to display the connection status information of each electric home appliance in the form of an icon, to remove the icon of the electric home appliance when it is determined, based on the result of the monitoring of the status sensing unit, that the connection of the electric home appliance to the network is in a released state, and to re-display the removed icon when the electric home appliance is re-connected to the network.

8. The home network system according to claim 6, wherein the server controller further comprises:
   an electronic home appliance database for storing connection status information or operation status information of each electronic home appliance.

9. The home network system according to claim 4, wherein the home server further comprises an input unit for externally inputting operation commands adapted to control respective electric home appliances.

10. The home network system according to claim 9, wherein the input unit comprises a touch screen adapted to input the operation commands for respective electric home appliances when associated portions of the touch screen are touched.

11. The home network system according to claim 4, wherein the home server further comprises:
   an input/output device for externally inputting operation commands adapted to control respective electric home appliances, or outputting information about respective statuses of the electric home appliance or respective connection statuses of the electric home appliances.

12. A method for controlling a home network system including electric home appliances connected to a network, comprising the steps of:
   (A) controlling each of the electric home appliances to transmit an alive message informing of the fact that the electric home appliance is in operation;
   (B) receiving the alive message, and identifying an operation status of the electric home appliance, based on the received alive message; and
   (C) displaying the identified operation status of the electric home appliance.

13. The method according to claim 12, further comprising the step of:
   (D) transmitting a status identification request message to the electric home appliance to identify whether the electric home appliance is operating normally, when no alive message from the electric home appliance is received for a predetermined time at the step (B).

14. The method according to claim 13, further comprising the steps of:
   (E) maintaining the electric home appliance in the connected state thereof, when the identified operation status of the electric home appliance is displayed at the step (C), and returning to the step (B); and
   (F) temporarily releasing the connected state of the electric home appliance when no status identification message from the electric home appliance is received for a predetermined time in response to the status identification request message at the step (D).

15. The method according to claim 14, further comprising the step of:
   (G) removing an icon representing the displayed identified operation status of the electric home appliance when the connected state of the electric home appliance is temporarily released at the step (F).

* * * * *